United States Patent
George et al.

(10) Patent No.: US 12,463,280 B2
(45) Date of Patent: Nov. 4, 2025

(54) BATTERY ASSEMBLY

(71) Applicant: McLaren Automotive Limited, Woking (GB)

(72) Inventors: Sunoj Cherian George, Woking (GB); James Douglas McLaggan, Woking (GB); Elie Talj, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 18/907,053

(22) Filed: Oct. 4, 2024

(65) Prior Publication Data

US 2025/0167372 A1    May 22, 2025

Related U.S. Application Data

(63) Continuation of application No. 17/277,258, filed as application No. PCT/GB2019/052603 on Sep. 17, 2019, now Pat. No. 12,148,943.

(30) Foreign Application Priority Data

Sep. 18, 2018    (GB) ........................................ 1815181
Sep. 18, 2018    (GB) ........................................ 1815183

(51) Int. Cl.
*H01M 50/244* (2021.01)
*H01M 50/213* (2021.01)
(Continued)

(52) U.S. Cl.
CPC ....... *H01M 50/244* (2021.01); *H01M 50/213* (2021.01); *H01M 50/264* (2021.01);
(Continued)

(58) Field of Classification Search
CPC ............. H01M 50/244; H01M 50/213; H01M 50/264; H01M 50/505; H01M 50/516;
(Continued)

(56) References Cited

U.S. PATENT DOCUMENTS 5,849,431 A * 12/1998 Kita ................. H01M 10/0431
429/170
6,917,183 B2    7/2005 Barlev et al.
(Continued)

FOREIGN PATENT DOCUMENTS

CN    205723741 U    11/2016
CN    107204418 A    9/2017
(Continued)

OTHER PUBLICATIONS

GB Search Report issued in GB Application No. GB1815181.1 date of search Feb. 12, 2019. 5 pages.
(Continued)

*Primary Examiner* — Lawrence Averick
(74) *Attorney, Agent, or Firm* — Mintz Levin Cohn Ferris Glovsky and Popeo, P.C.

(57) ABSTRACT

A method for assembling a battery module, the method comprising: providing a cell tray defining a plurality of cell holes for holding cells; inserting cells into respective cell holes so that the cells each protrude from the cell tray at each end of the cell; attaching a first casing to a first side of the cell tray to enclose the cell ends protruding from the first side; and attaching a second casing to a second side of the cell tray to enclose the cell ends protruding from the second side.

15 Claims, 10 Drawing Sheets

(51) Int. Cl.
*H01M 50/264* (2021.01)
*H01M 50/284* (2021.01)
*H01M 50/505* (2021.01)
*H01M 50/516* (2021.01)
*H01M 50/522* (2021.01)
*H01M 50/528* (2021.01)
*H01M 50/569* (2021.01)

(52) U.S. Cl.
CPC ....... *H01M 50/505* (2021.01); *H01M 50/516* (2021.01); *H01M 50/522* (2021.01); *H01M 50/528* (2021.01); *H01M 50/284* (2021.01); *H01M 50/569* (2021.01); *Y02P 70/50* (2015.11)

(58) Field of Classification Search
CPC ............ H01M 50/522; H01M 50/528; H01M 50/284; H01M 50/569; H01M 50/22; Y02E 60/10; Y02P 70/50; B23K 26/04
See application file for complete search history.

(56) References Cited

U.S. PATENT DOCUMENTS

| | | | |
|---|---|---|---|
| 8,920,955 B1* | 12/2014 | Chuang | H01M 10/653 429/7 |
| 9,331,314 B2 | 5/2016 | Fuhr et al. | |
| 11,196,109 B2 | 12/2021 | Bikmukhametov et al. | |
| 2003/0205987 A1 | 11/2003 | Barlev et al. | |
| 2007/0090788 A1 | 4/2007 | Hansford et al. | |
| 2011/0135975 A1 | 6/2011 | Fuhr et al. | |
| 2012/0015235 A1 | 1/2012 | Fuhr et al. | |
| 2015/0070021 A1* | 3/2015 | Dulle | H01M 50/209 324/426 |
| 2016/0118633 A1 | 4/2016 | Hongo et al. | |
| 2020/0052354 A1* | 2/2020 | Bikmukhametov | H01M 50/503 |
| 2020/0141795 A1* | 5/2020 | Lavine | G01J 1/0403 |

FOREIGN PATENT DOCUMENTS

| | | |
|---|---|---|
| CN | 207303583 U | 5/2018 |
| CN | 108110371 A | 6/2018 |
| EP | 2 282 391 A2 | 2/2011 |
| EP | 2 282 391 A3 | 3/2011 |
| GB | 2458943 A | 10/2009 |
| GB | 2522443 A | 7/2015 |
| WO | WO-2014/093607 A1 | 6/2014 |
| WO | WO-2016/117686 A1 | 7/2016 |
| WO | WO-2020/058690 A1 | 3/2020 |

OTHER PUBLICATIONS

GB Search Report issued in GB Application No. GB1815183.7 date of search Feb. 25, 2019. 3 pages.

International Search Report and Written Opinion issued in International Application No. PCT/GB2019/052603, mailed Nov. 22, 2019 (Nov. 22, 2019). 12 pages.

* cited by examiner

BATTERY ASSEMBLY

CROSS-REFERENCES TO RELATED APPLICATIONS

This application is a continuation of U.S. patent application Ser. No. 17/277,258, filed Mar. 17, 2021, which claims priority under 35 U.S.C. § 371 to International Application No. PCT/GB2019/052603 filed Sep. 17, 2019, the contents of which are hereby incorporated by reference herein in their entirety.

This invention relates to a method for assembling a battery module.

Electric powered or hybrid vehicles are well known and are becoming increasingly prevalent as the desire to reduce carbon emissions increases. In such vehicles, the power that can be provided by, and the weight of, the battery is vital in determining the performance of the vehicle. The power to weight ratio of the battery is therefore something that vehicle designers are trying to optimise. This can clearly be done either by increasing the power generated for a given weight or by reducing the weight for a given power output, or most likely a combination of the two.

The batteries in electric or hybrid vehicles are typically made up of a plurality of individual battery cells connected together in such a way to allow large amounts of power to be provided to drive the wheels or power other systems in the vehicle. These cells are typically provided in the form of one or more battery modules which can be electrically connected together.

Batteries of this type tend to have a housing into which the cells are inserted. Electrical connections between the cells may be made using conductors that connect to cell terminals. As the cells have been inserted into a housing the cell terminals can tend to be located at one end of the cells to permit connection thereto. After any electrical connections that are required are made, a cover can be placed on the housing to enclose the cells. Such a design of battery can mean that the cells have to be designed in a particular way to be compatible with the housing and method of electrical connection. In addition, it can be difficult to service such batteries once assembled.

It would therefore be desirable if there was an improved method of assembling a battery module.

According to a first aspect of the present invention there is provided a method for assembling a battery module, the method comprising: providing a cell tray defining a plurality of cell holes for holding cells; inserting cells into respective cell holes so that the cells each protrude from the cell tray at each end of the cell; attaching a first casing to a first side of the cell tray to enclose the cell ends protruding from the first side; and attaching a second casing to a second side of the cell tray to enclose the cell ends protruding from the second side.

The cells may each comprise cell terminals, and the method may comprise attaching electrical connections between cell terminals. The cells may have a first cell terminal located on a portion of the cell protruding to the first side of the cell tray, and the method may comprise attaching electrical connections between first cell terminals before attaching the first casing. The method may comprise attaching electrical connections to all of the first cell terminals before attaching the first casing.

The cells may have a second cell terminal located on a portion of the cell protruding to the second side of the cell tray, and the method may comprise attaching electrical connections between second cell terminal before attaching the second casing. The method may comprise attaching electrical connections to all of the second cell terminals before attaching the second casing. The method comprising attaching electrical connections between the cell terminals before attaching the first casing and the second casing. Attaching electrical connections between cell terminals may comprise attaching at least one busbar between cell terminals.

Inserting cells into respective cell holes may comprise securing the cells to the cell tray. Securing the cells to the cell tray may comprise inserting cells into respective cell holes until an interference fit is achieved between the cell tray surrounding the cell hole and the cell inserted into the respective cell hole. Securing the cells to the cell tray may comprise affixing the cells to the cell tray once inserted into respective cell holes.

Inserting cells into respective cell holes may comprise inserting cells into each of the cell holes. Attaching the first casing may comprise welding the first casing to the cell tray. Attaching the second casing may comprise welding the second casing to the cell tray. The cell holes may extend through the cell tray along a first direction, the first casing may be attached to the first side of the cell tray substantially in the first direction, and the second casing may be attached to the second side of the cell tray substantially opposite to the first direction.

There is also provided a method of manufacturing a battery module comprising a plurality of elongate cells each cell having a pair of cell terminals, the terminals of the pair being located on opposing ends of the cell, and a first busbar having a plurality of through holes therethrough, the method comprising: aligning through holes of the first busbar with cell terminals on a first end of the elongate cells, such that each aligned through hole is aligned with a respective cell terminal; and after aligning, electrically connecting the first busbar to said cell terminals on the first end of the elongate cells.

Aligning may comprise optically aligning. Each cell terminal may comprise a visual marking, and optically aligning may be performed in dependence on the visual marking. Optical aligning may comprise centering the visual marking of each cell terminal with respect to a through hole of the first and/or second busbar.

Electrically connecting may comprise welding a portion of the first and/or second busbar to each cell terminal. Welding may comprise optically aligning a welding tool with a cell terminal. Each cell terminal may comprise a visual marking, and optical alignment of the welding tool may be performed in dependence on the visual marking. The welding process may be automated. The welding tool may be configured to perform a predetermined weld pattern in dependence on the visual marking.

A cell terminal of the pair of cell terminals of each cell may comprise a cell fill plug. The busbars 10 may be sized and shaped such that, in use, they are not in electrical contact with the cell fill plug. Electrically connecting may comprise welding a portion of the first and/or second busbar to each cell terminal in a manner that avoids welding onto the cell fill plug and/or a weld associated with the cell fill plug.

BRIEF DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Battery Overview

Figure 1:
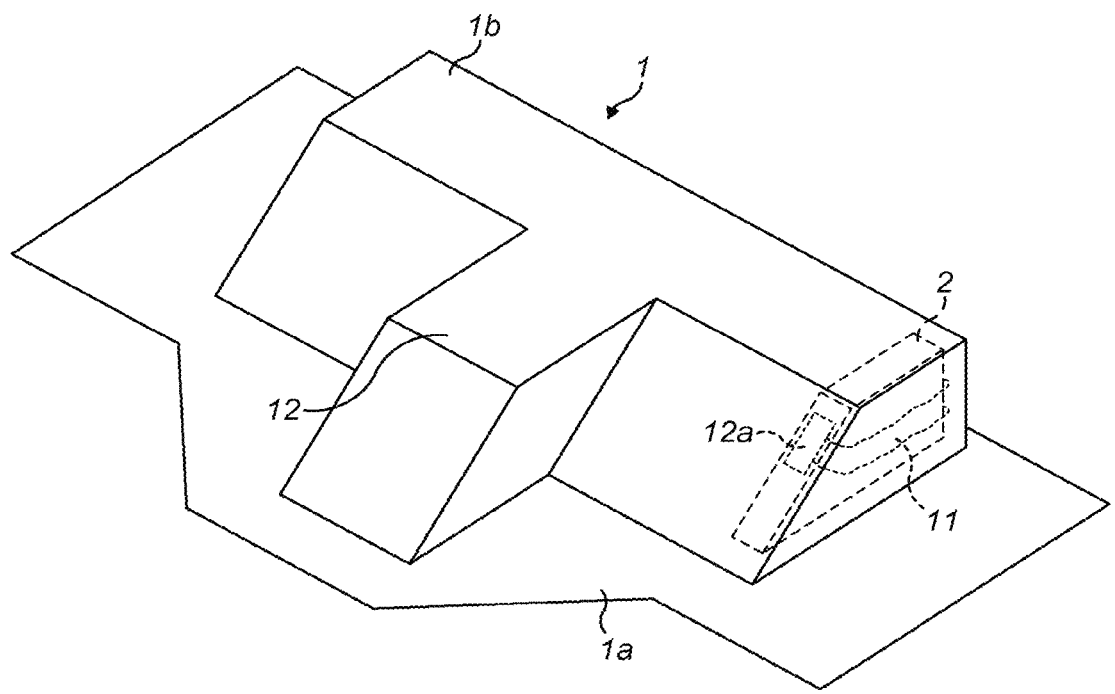
FIG. 1 shows a battery.

FIG. 1 shows a battery 1 which may comprise a number of identical battery modules 2. The battery modules may be arranged in a row. The battery may comprise any number of battery modules 2. In the example depicted in FIG. 1, one battery module 2 is shown for clarity, but in a preferred example there may be thirteen modules.

The battery may be installed in a vehicle. FIG. 1 shows the battery 1 fixed to a battery floor 1a. The battery floor 1a may be structurally integral to the vehicle in which the battery is installed. For example, the battery floor may be a load bearing component of a vehicle chassis. The battery floor 1a may be configured to be removably fitted to the vehicle so that the battery 1 can be removed from the vehicle. For example, for maintenance or replacement of the battery 1.

The battery 1 may further comprise a battery control unit 12 which protrudes from the row of battery modules. The battery control unit 12 may be electrically connected to one or more module control units 12a. Each battery module 2 may comprise an attached module control unit 12a. The battery control unit 12 may control each battery module control unit 12a. Each battery module control unit 12a may control the activity of the respective attached battery module. Each battery module control unit 12a may receive information concerning the operation of the respective attached battery module. The battery module control units 12a may process that information and feed that information to battery control unit 12.

The battery modules and battery control unit 12 may be enclosed by the battery floor 1a and a battery housing 1b.

Figure 2:
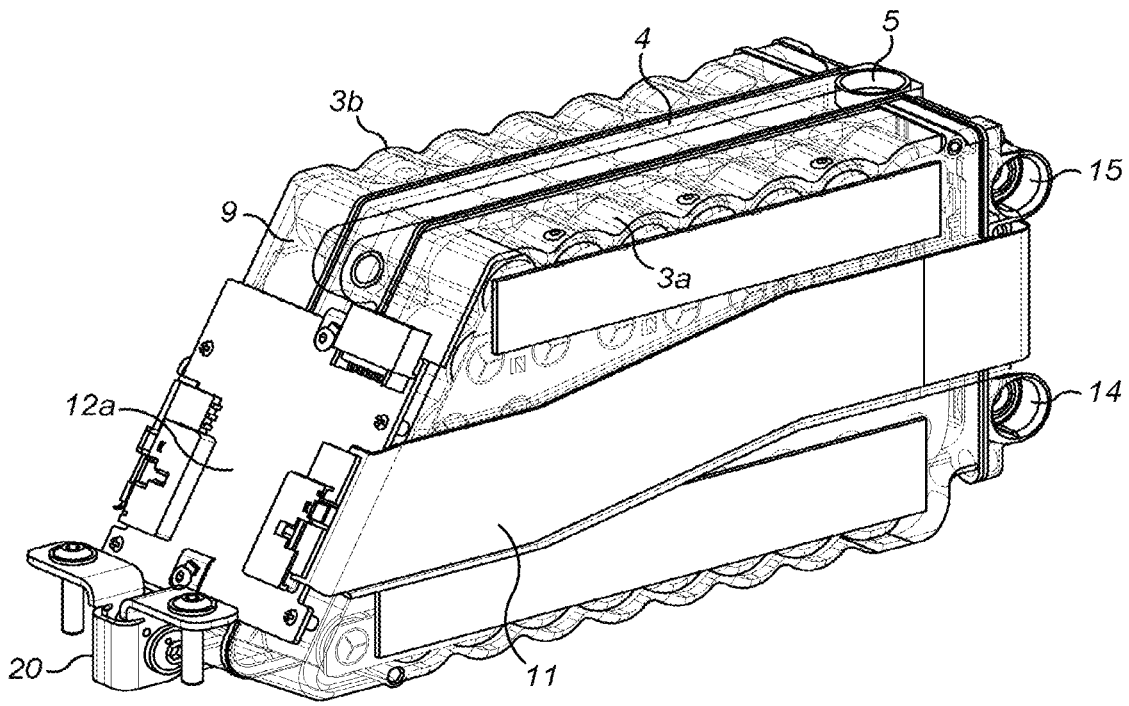
FIG. 2 shows a battery module from the front.

FIG. 2 shows a battery module 2 with a trapezoidal prism shape. The battery module depicted in FIG. 2 comprises a cell tray 4 and a two-part housing 3a, 3b. In FIG. 2, the battery module 2 and the cell tray 4 share a common longitudinal axis.

Cell Tray

Figure 4:
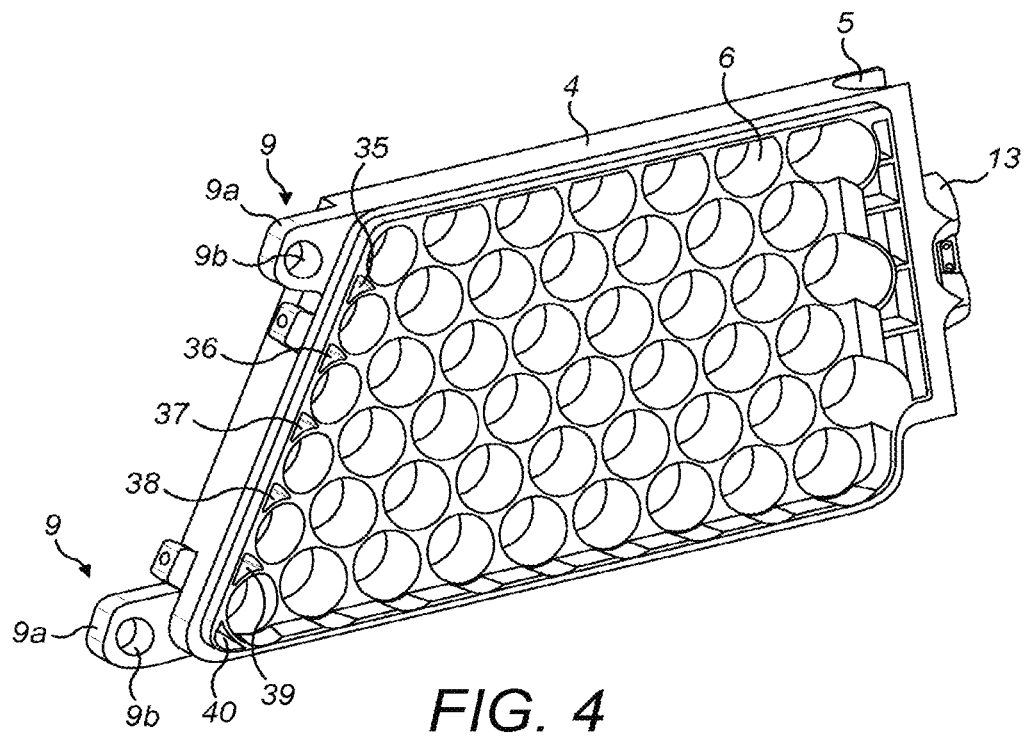
FIG. 4 shows a cell tray.

An exemplary cell tray 4 is shown in FIG. 4. The cell tray depicted in FIG. 4 comprises cell holes 6 for holding cells (not shown). Each cell hole 6 may extend through the cell tray in a direction perpendicular to the longitudinal axis of the cell tray. The cell tray may be formed of electrically insulating material.

The cell tray may further comprise a fixing hole 5 configured to receive a fixing element (not shown) for securing the cell tray 4, and hence the battery module 2, to the battery floor (not shown).

FIG. 4 shows the cell tray 4 comprising two fixings 9, each fixing comprising a tab 9a, the tab forming a connection hole 9b. Both fixings are generally positioned in the same plane as the cell tray. Each connection hole 9b may extend through its respective tab 9a in a direction parallel to the direction in which the cell holes 6 extend through the cell tray 4. The cell tray may comprise more than two fixings. The cell tray may comprise a single fixing. Fixings on multiple battery modules may receive one or more common elements so that the battery modules can be secured to one another.

Figure 5:
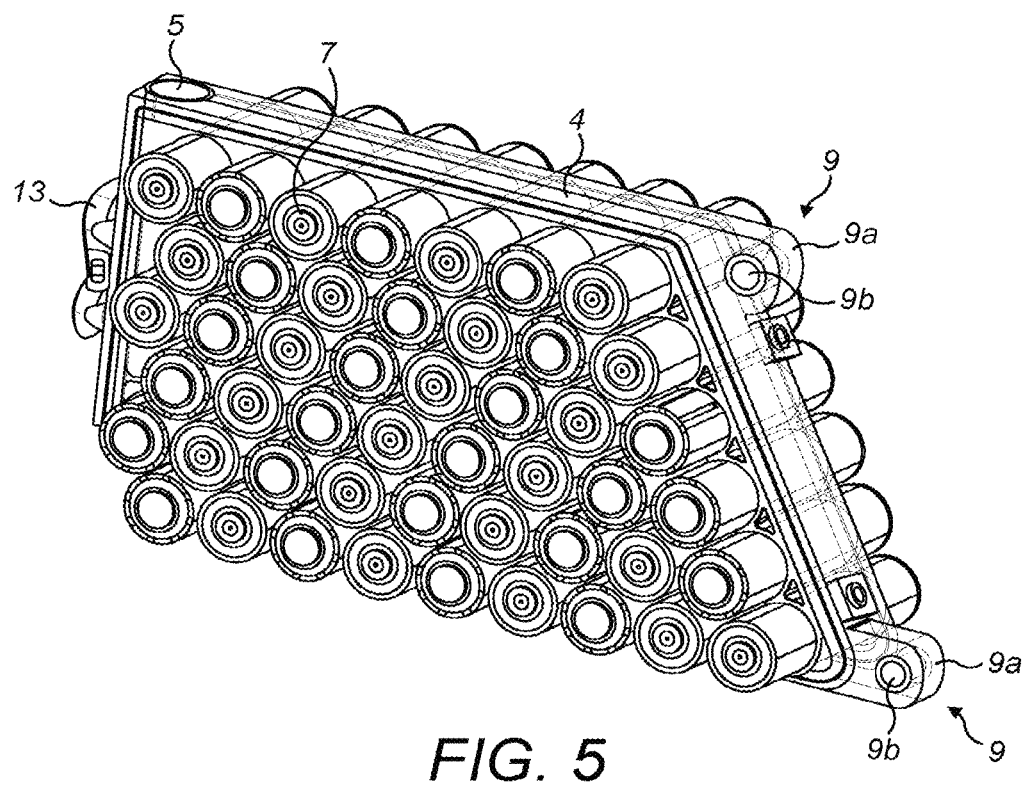
FIG. 5 shows a cell tray holding cells.

FIG. 5 shows a number of cells 7 being held in the cell holes 6 of the cell tray 4. The cell tray may be configured to hold any number of cells. In the example depicted in FIG. 5 there are forty-eight cells held in respective cell holes 6. Each cell hole may hold one cell.

Resin may be poured into a recessed side of the cell tray. The resin may harden around cells placed in the cell tray so as to secure the cells in the cell tray. Alternatively, each cell 7 may be held in a cell hole 6 by an interference fit between the cell tray 4 surrounding the cell hole and the cell inserted into the respective cell hole.

Each cell hole may extend through the cell tray in a direction perpendicular to the longitudinal axis of the cell tray. In the example cell tray depicted in FIGS. 4 and 5, each cell hole is cylindrical so as to accommodate cylindrical cells. In other examples, each cell hole may be prismatic so as to accommodate prismatic cells.

The length of each cell may be greater than the length of each cell hole. Each cell 7 comprises a positive terminal and negative terminal. When a cell 7 is inserted into a cell hole 6, a length of the cell 7 comprising the positive terminal of the cell may protrude from the cell hole on one side of the cell tray 4 whilst a length of the cell 7 comprising the negative terminal protrudes from the cell hole on the other side of the cell tray. The portion of the cell 7 comprising the positive terminal and the portion of the cell 7 comprising the negative terminal may protrude from opposite sides of the cell tray. The protruding length of the portion of the cell comprising the cell's positive terminal and the protruding length of the portion of the cell comprising the cell's negative terminal may be equal.

The battery module 2 shown in FIG. 2 comprises a two-part module housing 3a, 3b. The housing 3a, 3b may form two enclosed regions which contain the cells 7 held in the cell tray 4. In FIG. 2, one part of the module housing 3a encloses the portions of cells protruding on one side of the cell tray. The second part of the module housing 3b encloses the portions of the cells protruding on the opposite side of the cell tray.

Figure 3:
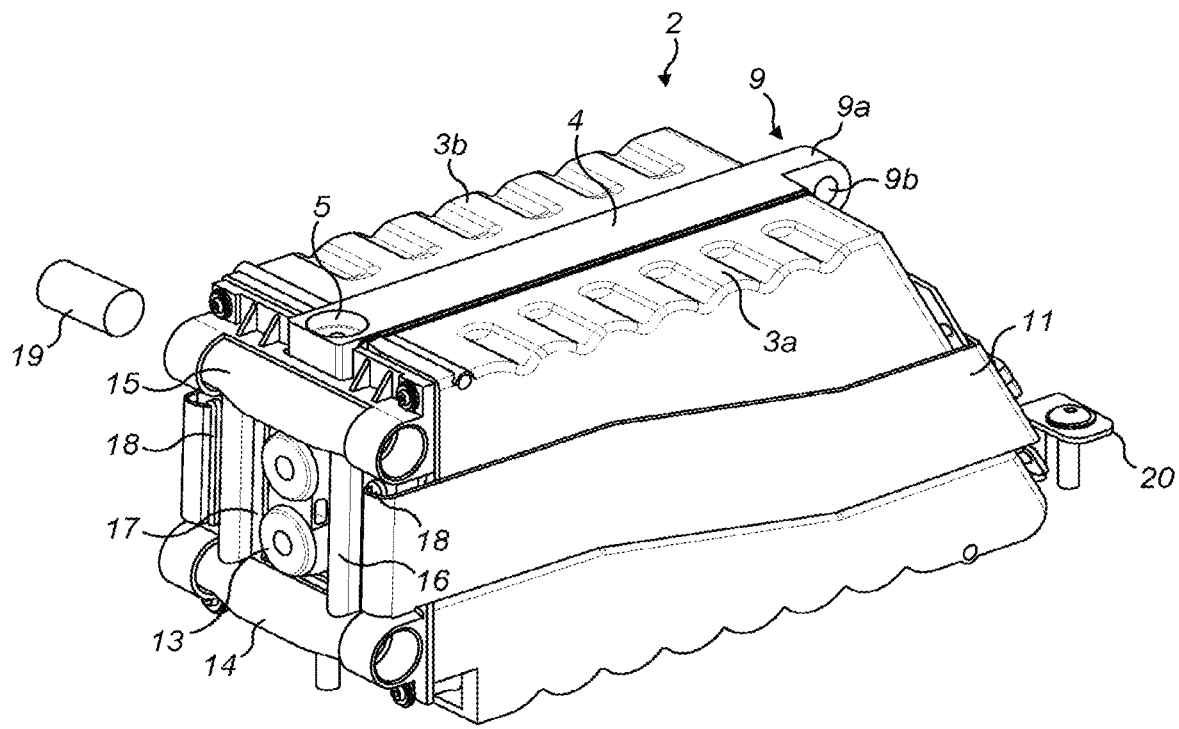
FIG. 3 shows a battery module from the back.

In FIGS. 2 and 3, the exterior faces of the battery module 2 comprise faces of the cell tray 4 and the housing 3a, 3b. Alternatively, the housing 3a, 3b may enclose the entirety of the cell tray. In this case, the exterior faces of the battery module would comprise faces of the housing 3a, 3b.

Cell to Cell Busbars and Flexible Printed Circuit Board

Figure 7:
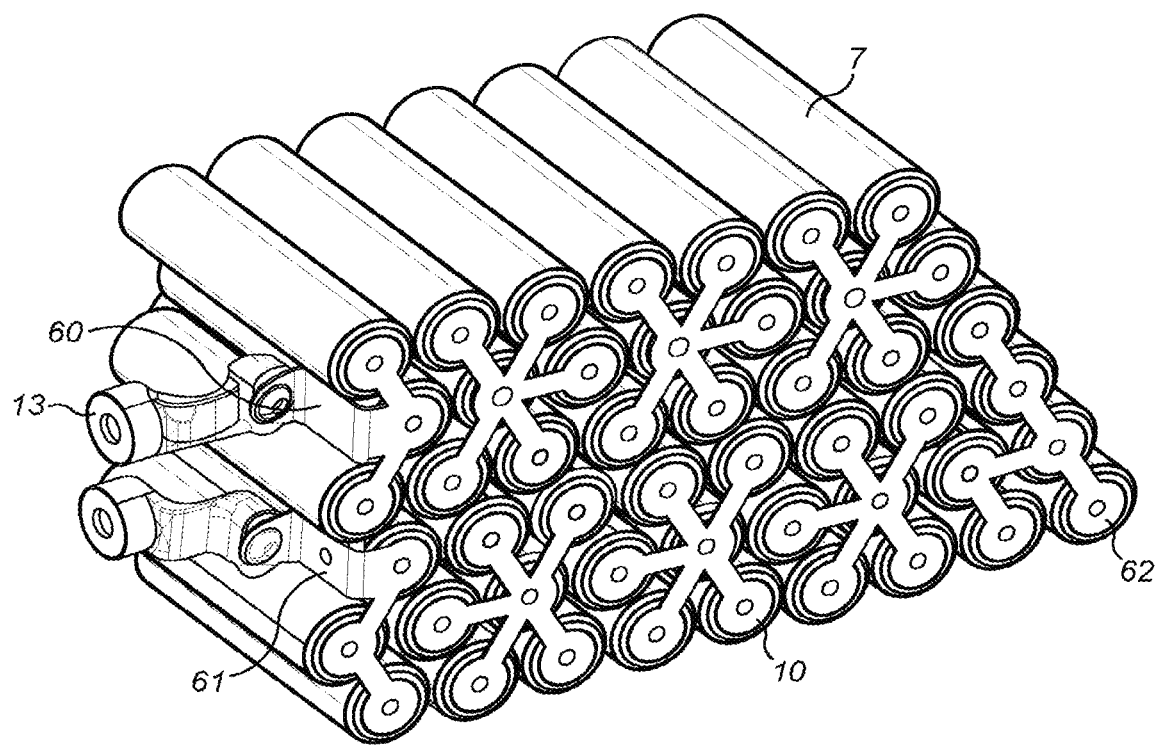
FIG. 7 shows the cells, busbars and module terminals of a battery module.

FIG. 7 shows busbars 10 contacting the terminals of multiple cells to form electrical connections between the multiple cells 7. The busbars 10 are formed of electrically conductive material. The busbars 10 may be formed of metal, for example copper or aluminium.

As above, the cell tray 4 (not shown in FIG. 7) fixedly holds cells 7, each cell having a positive terminal and a negative terminal. The busbars 10 may link the cell terminals of any number of cells.

Cells 7 may be arranged in the cell tray 4 so that positive and negative cell terminals protrude from opposite sides of the cell tray. In this way, a current flow path may be created through cells and busbars. For example, the current flow path may "snake" through the battery module. The current flow path may repeatedly intersect the cell tray. The current flow path may repeatedly intersect the longitudinal axis of the battery module. At least some of the cells may be connected in parallel by the busbars 10, meaning that the current flow path passes through multiple cells as the current flow path intersects the cell tray.

Module terminals 13 are shown in FIG. 7. The module terminals 13 are positioned on the back of the battery module and may be integral to the cell tray 4 (not shown in FIG. 7). Module terminals 13 of neighbouring battery modules may be electrically connected, for example, by module to module busbars. The module terminals 13 allow a supply of current to and/or from the cells 7 of the battery module 2.

Figure 6:
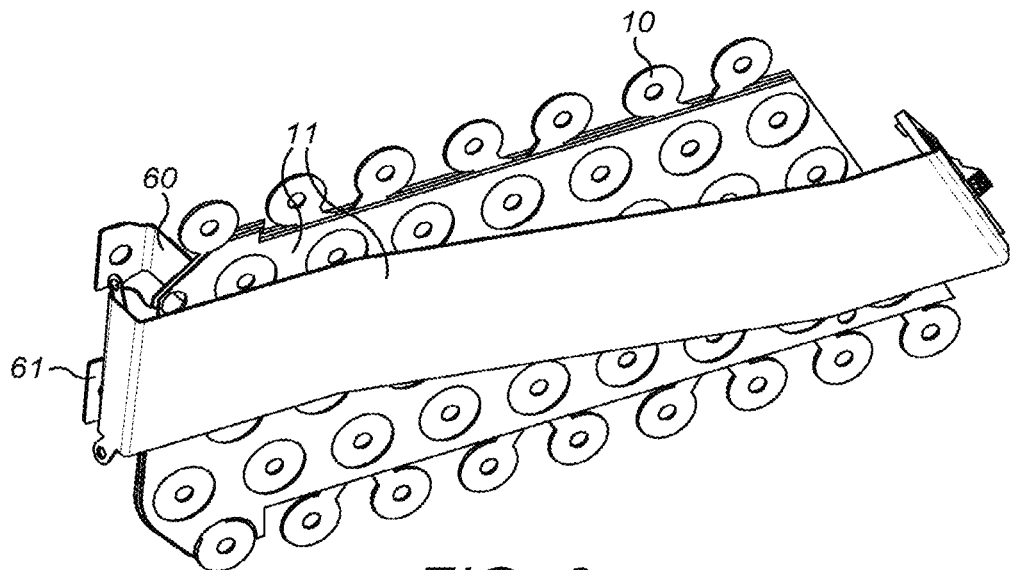
FIG. 6 shows the busbars and flexible printed circuit of a battery module.

The busbars 10 may be integrated with a flexible printed circuit board (not shown in FIG. 7). FIG. 6 shows the flexible printed circuit board 11 of a battery module. A portion of the flexible printed circuit board 11 is located in the region enclosed by the module housing and another portion of the flexible printed circuit board 11 is wrapped around the exterior faces of both parts of the two-part module housing 3a, 3b, also shown in FIGS. 2 and 3.

The busbars 10 shown in FIGS. 6 and 7 may be integrated with the flexible printed circuit board 11. The busbars 10 may be configured to conduct a high level of current between the cells of the module and the module terminals 13.

The flexible printed circuit board 11 shown in FIG. 6 may further comprise sense wires. The sense wires may be configured to conduct a low current signal. The sense wires in the flexible printed circuit board may be attached to voltage sensors. Each voltage sensor may be capable of determining the voltage at a point on the busbar. Each voltage sensor may be capable of determining the voltage being drawn from a cell. Each voltage sensor may be capable of inferring the voltage being drawn from a cell from a measurement taken of the voltage being drawn from a busbar 10. Each sense wire in the flexible printed circuit board may be capable of communicating voltage measurements from a voltage sensor to a module control unit 12a, shown in FIG. 1. The module control unit 12a may be capable of adapting the activity of the battery module in response to the voltage measurements provided by the sense wire. Each sense wire may be capable of communicating voltage measurements to the battery control unit. The module control unit 12a may be capable of communicating voltage measurements to the battery control unit. The battery control unit 12, also shown in FIG. 1, may be capable of adapting the activity of the battery module in response to the voltage measurements. The battery control unit 12 may be capable of adapting the activity of the battery in response to the voltage measurements.

The sense wires of the flexible printed circuit board 11 may be attached to one or more temperature sensors. A temperature sensor may be capable of determining the temperature of a part of the battery module. Each sense wire may be capable of communicating temperature measurements from a temperature sensor to the module control unit. The module control unit may be capable of adapting the activity of the battery module in response to the temperature measurements provided by the sense wire. Each sense wire may be capable of communicating temperature measurements to the battery control unit. The module control unit may be capable of communicating temperature measurements to the battery control unit. The battery control unit may be capable of adapting the activity of the battery module in response to the temperature measurements. The battery control unit may be capable of adapting the activity of the battery in response to the temperature measurements.

The sense wires may be attached to other types of sensors, for example current sensors, and/or fluid flow sensors.

FIGS. 6 and 7 also show terminal tabs 60, 61 which each of which connect either a positive or a negative end of the busbar to the respective positive or negative module terminal.

Module Cooling

It is known to supply coolant to regulate the temperature of batteries. In typical batteries, the coolant is confined within coolant jackets or pipes. In such batteries, cells are cooled in areas of the cell which make contact with the jacket or pipe containing the coolant. This is a slow and inefficient cooling method.

In other typical batteries, coolant is not confined by coolant jackets or pipes, but makes direct contact only with the body/centre portion of each cell. In such batteries, the cell terminals are protected so that coolant does not make contact with the cell terminals. Such contact is avoided as it would typically lead to electrical shorting. This is also an inefficient method because the cell terminals, being electrically connected, are often the hottest parts of the cell and yet they are not directly cooled by the coolant.

By contrast, in the battery module described herein, coolant supplied to the battery module 2 makes direct contact with cell terminals, flexible printed circuit board 11, busbars 10, and cell body. The entirety of the cell and connected conducting parts are bathed in coolant. The coolant used is a dielectric oil. Dielectric oils have insulating properties. Cells drenched in dielectric oil are insulated from one another preventing short circuiting between cells. This is an efficient method of regulating cell temperature. Such efficient cooling enables the cells to operate at a higher power and for longer. This means that fewer and/or smaller cells are required to generate the same power as batteries utilising the previously mentioned cooling methods.

FIG. 3 shows a supply coolant conduit portion 14 and a drain coolant conduit portion 15. In the exemplary configuration shown in FIG. 3, the supply coolant conduit portion 14 is positioned in a lower position and the drain coolant conduit portion 15 is positioned in an upper position. Such a configuration reduces the risk of air locks occurring during filling. Alternatively, the supply coolant conduit portion may be positioned in an upper position and the drain coolant conduit portion may be positioned in a lower position.

Both coolant conduit portions may extend along the battery module in a direction orthogonal to the longitudinal axis of the battery module. Both coolant conduit portions may extend along the battery module in a direction orthogonal to the direction in which the fixing hole 5 extends through the cell tray 4. Both coolant conduit portions may extend along the battery module in a direction parallel to the direction in which the cell holes 6 extend through the cell tray 4.

As shown in FIG. 3, the supply coolant conduit portion 14 is linked to an inlet 16 in the battery module so that coolant may be supplied to a region enclosed by the housing of the battery module. The drain coolant conduit portion 15 is linked to an outlet 17 so that coolant may be drained from a region enclosed by the housing of the battery module. Inlet 16 and outlet 17 are openings formed in the module housing. The coolant may be supplied to one of the two regions enclosed by the housing and be drained from the other of the two regions enclosed by the housing, one region being on an opposite side of the longitudinal axis of the cell tray to the other region. The cell tray 4 may comprise through-holes 35 to 40 for allowing the passing of coolant from a respective one of the said regions to the other of the said regions. The through-holes may be located in the cell tray 4 at the end of the cell tray 4 remote from the inlet 16 and outlet 17. The through-holes may be shaped to promote even fluid flow over the cells.

As shown in FIG. 1, battery 1 contains a number of battery modules 2 arranged in a row. When battery modules 2 are positioned in a row, a coolant conduit portion 14 of one battery module aligns with a coolant conduit portion of a neighbouring battery module. The two coolant conduit portions may be connected to one another by a coupler 19, shown in FIG. 3. Couplers 19 form liquid tight connections between coolant conduit portions so that coolant may flow from portion to portion. When supply coolant conduit portions 14 of the battery modules in the row of battery modules are connected by couplers 19, they form a supply coolant conduit 14*a* which extends along the length of the row of battery modules. When drain coolant conduit portions 14 of the battery modules in the row of battery modules are connected by couplers 19, they form a drain coolant conduit 15*a* which extends along the length of the row of battery modules.

As shown in FIG. 1, the longitudinal axes of all the battery modules 2 in the row of battery modules of the battery 1, may be parallel to one another. Both coolant conduits 14*a*, 15*a* may extend along the row of battery modules in a direction orthogonal to the longitudinal axes of the battery modules in the row of battery modules. Both coolant conduits may extend along the row of battery modules in a direction orthogonal to the direction in which the fixing hole 5 extends through the cell tray 4 of each battery module. Both coolant conduits may extend along the row of battery modules in a direction parallel to the direction in which the cell holes 6 extend through the cell tray 4 of each battery module.

Inlet 16 and outlet 17 may be configured to allow coolant to enter and leave the battery module 2. Inlet 16 and outlet 17 may further act as passages through which the flexible printed circuit boards 11 pass between the interior and exterior of the battery module, as shown in FIG. 3. The inlet 16 and outlet 17 may be the only openings in the two-part housing 3*a*, 3*b* of the battery module 2. FIG. 3 shows sealant 18 around the inlet 16 and outlet 17. Sealant 18 ensures that coolant inside the battery module does not leak from the battery module into other parts of the battery.

The method of direct cell cooling described herein also has further advantages in the case that excessive pressure builds up inside a cell. Each cell may comprise a cell vent port. In the case that excessive pressure builds up inside the cell, the cell vent port may be activated, allowing fluids within the cell to escape the cell. The cell vent port may be configured to expel cell fluids in the event that pressure within the cell exceeds a threshold. Upon leaving the cell, the fluids are quenched by the surrounding coolant.

Method of Battery Assembly

A method by which the battery module pictured in the figures can be assembled will now be described. The assembly method will be described with reference to FIGS. 8, 9 and 10.

As shown in step 101, a cell tray 4 is provided. The cell tray 4 may be as pictured in FIG. 4. As described herein, the cell tray 4 defines a plurality of cell holes 6 for holding cells 7. The cell holes 6 may extend through the cell tray 4 in a direction perpendicular to the longitudinal axis of the cell tray. The cell holes 6 are unobstructed so that cells 7 can be inserted into the holes 6.

Figure 9:
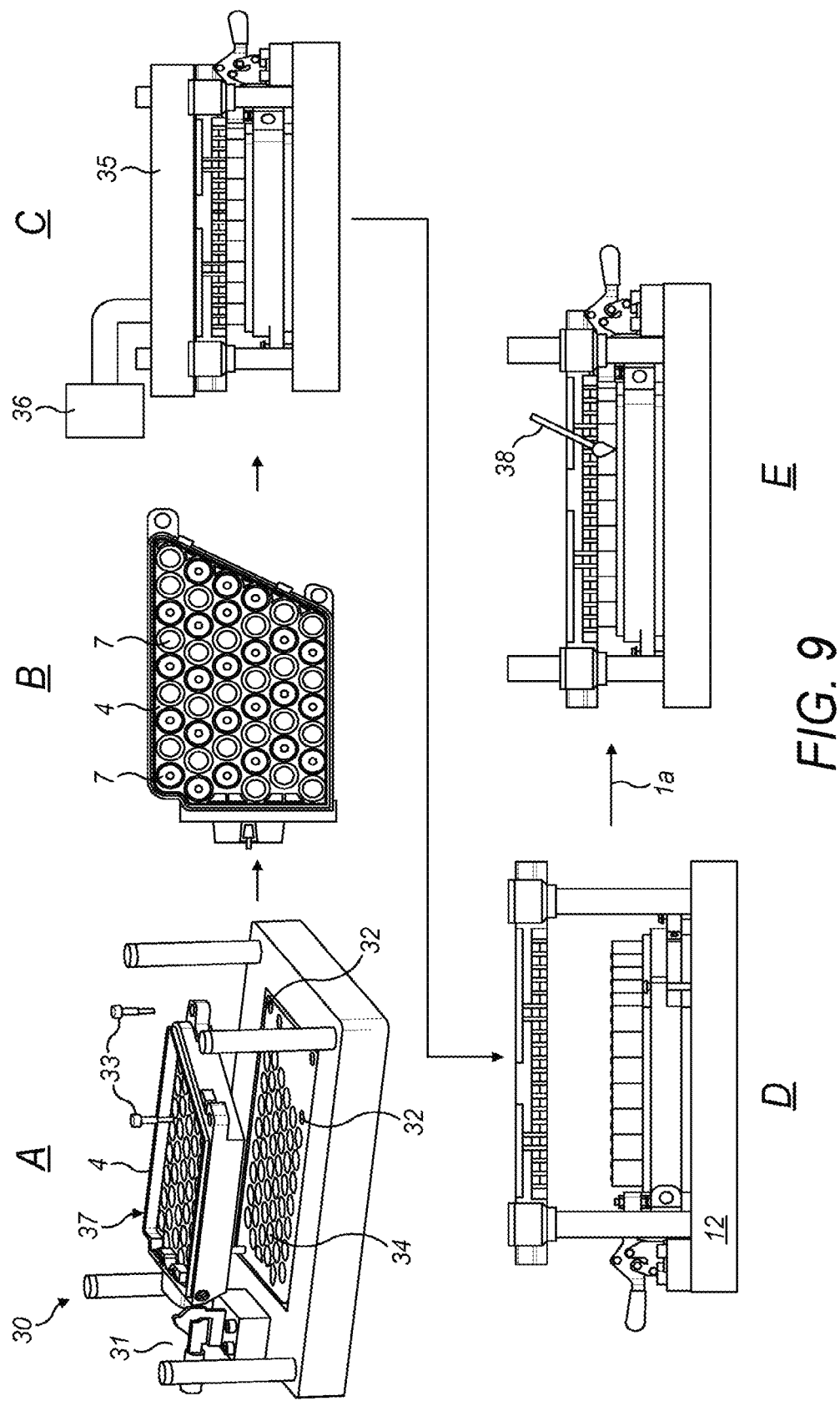
FIG. 9 shows a schematic diagram of part of the battery module assembly process.

As shown in step 102, the cell tray 4 is inserted into a jig 30 prior to the cells 7 being inserted into the cell holes 6. The jig 30 may have a shape which means the cell tray 4 is held in a fixed position whilst the cell tray 4 is held in the jig 30. As shown in FIG. 9, the jig 30 has a clamp 31 which is configured to releasably hold one end of the cell tray 4 in a fixed position relative to the jig 30. In FIG. 9, the clamp 31 holds the end of the cell tray 4 where the module terminals 13 are located. The jig 30 also has threaded holes 32 which are positioned on the jig so that screws 33 can be inserted through the fixing holes 9*b* located at the opposite end of the cell tray 4 to the module terminals 13 and screwed into the threaded holes 32. The threaded holes 32 and the clamp 31 are positioned so that the cell holes 6 in the cell tray 4 are located over corresponding indentations 34 in the jig 30. These indentations 34 are shaped to receive cells 7. The indentations 34 each have a depth that corresponds to the desired projection of the cells 7 from the cell tray 4 on the side of the cell tray adjacent to the surface of the jig 30. The indentations 34 each have a cross-sectional shape that means the cells are held in the required orientation through the holes in the cell tray 4. The jig may be shaped so that when the cells 7 are inserted into respective cell holes 6 the cells are held at a uniform depth within the cell holes 6. This means that the cells 7 may be held in place protruding from the cell tray 4. The cells 7 may be held in place protruding by an equal amount from each side of the cell tray 4.

As shown in step 103, cells 7 are inserted into respective cell holes 6. The cells 7 are inserted into respective cell holes 6 so that the cells each protrude from the cell tray at each end of the cell. This is as shown in FIG. 5. The cells 7 may all be inserted from the same side of the cell tray 4. This will be the case when the jig shown in FIG. 9 is used. Alternatively, some cells 7 may be inserted from one side of the cell tray 4 and some cells 7 may be inserted from the other side of the cell tray 4. The cells 7 each have a respective cell terminal located at opposite ends of the cells 7. The polarity of one of the cell terminals on the cell has opposite polarity to the other of the cell terminals on the cell. The cells may be inserted so that the cell terminals presented on one side of the cell tray all have the same polarity. The cells may be inserted so that some of the cell terminals presented on one side of the cell tray have one polarity and some of the cell terminals presented on that side of the cell tray have opposite polarity. The chosen configuration of polarities will be particular to the power requirements of the battery module 2.

As shown in step 104, the polarity of the cells that have been inserted into the cell tray is checked. This can be achieved by lowering a circuit board 35 with contacts for each cell terminal on to the cell tray. The circuit board 35 is connected to a device 36 that tests the polarity of the cells 7.

As shown in step 105, the cells 7 are secured to the cell tray 4. The cells 7 may be secured to the cell tray 4 merely by their insertion into the cell tray 4 if the cell holes 6 of the cell tray 4 are shaped so that they have an interference fit with the perimeter of the cells 7. If the cells are not fully secured merely by their insertion, then cells 7 may be affixed to the cell tray 4. The cells 7 may be affixed to the cell tray 4 by the pouring of resin into the cell tray 4 and then curing of the resin. As shown in FIG. 9, the cell tray 4 may comprise a recess 37 into which resin can be poured or injected. The cell holes 6 may be shaped so that whilst they do not provide an interference fit to the cells the clearance between the cell holes 6 and the perimeter of the cells 7 is such that the resin does not flow through the gap between the cell holes 6 and the perimeter of the cells 7. This may be because the resin has a viscosity that is high enough that it is held in the gap between the cell holes 6 and the perimeter of the cells 7 rather than flowing through. A resin injection nozzle 38 is shown in FIG. 9E for the supply of resin but any suitable application method may be used.

In FIG. 9A, the cell tray 4 is shown as it is being inserted into jig 30. In FIG. 9B, the cell tray 4 is shown in a side view showing cells 7 inserted into each of the cell holes 6. The differing polarity of the cell terminals on that side of the cell tray 4 is shown by the different shading and shape of the cell terminals. In FIG. 9C, the testing of the polarity is shown. In FIG. 9D, the jig is shown with a cell support raised. In FIG. 9E, the jig is shown with a cell support lowered and resin being injected into the cell tray.

As shown in step 106, once the cells 7 have been secured to the cell tray 4, the cell tray 4 together with the cells 7 can be removed from the jig 30, if used.

Figure 10:
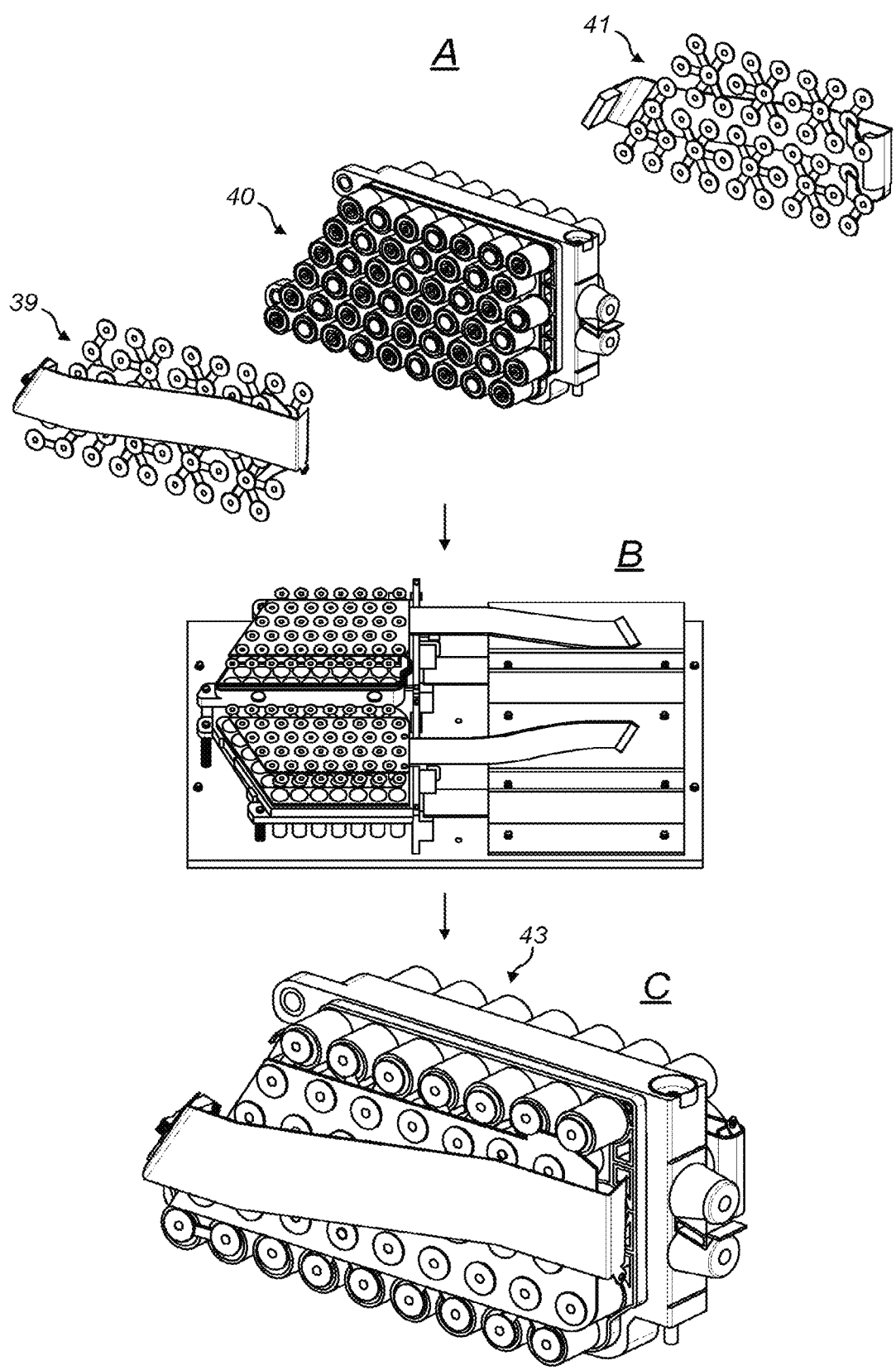
FIG. 10 shows a schematic diagram of another part of the battery module assembly process.

As shown in step 107, electrical connections can be attached between cell terminals. The attachment of electrical connections may comprise attaching electrical connections between first cell terminals that are located on a portion of the cell 7 protruding from a first side of the cell tray 4. The attachment of electrical connections may comprise attaching electrical connections between second cell terminals that are located on a portion of the cell 7 protruding from a second side of the cell tray 4. As shown in FIG. 10, busbars 10 may be attached to the cells 7. A first set of busbars 39 may be attached to the cell terminals 400 located on one side of the cell tray 4. A second set of busbars 41 may be attached to the cell terminals 42 located on a second side of the cell tray 4. The busbars may be placed over the cells 7 and then attached to the cell terminals. The attachment may be by welding the busbars to the cell terminals. The busbars may be encapsulated in a flexible material so that the position of the busbars is fixed in the plane of the busbars.

In FIG. 10A, the busbars and assembled cell tray 4 and cells 7 are shown. In FIG. 10B, the positioning of the busbars relative to the cell tray 4 and cells 7 (not shown for clarity) is shown. The busbars can then be attached to the cell terminals. In FIG. 10C, the assembled cell tray 4, cells 7 and busbars 39, 41 are shown at 43.

As shown in step 108, a first casing 3*a* is attached to a first side of the cell tray to enclose the cell ends protruding from the first side of the cell tray 4. The housing parts may also be known as casings. As shown in step 109, a second casing 3*b* is attached to a second side of the cell tray to enclose the cell ends protruding from the second side of the cell tray 4. When the first and second casings are attached to the cell tray the cells may be enclosed within the battery module. There may be holes in the casings through which, for example, coolant and/or wires can pass. Therefore, the cells being enclosed within the battery module may be taken to mean substantially enclosed within the battery module. The casings may be attached to the cell tray by any suitable means. For instance, the casings may be each be welded to the cell tray or the casings may be adhered to the cell tray. The attachment between the casings and the cell tray may be impervious to fluid so that fluid cannot flow through the join between the casings and the cell tray. The attachment of the first casing and the second casing to the cell tray may cause the casings to substantially fully enclose the cells.

Figure 11:
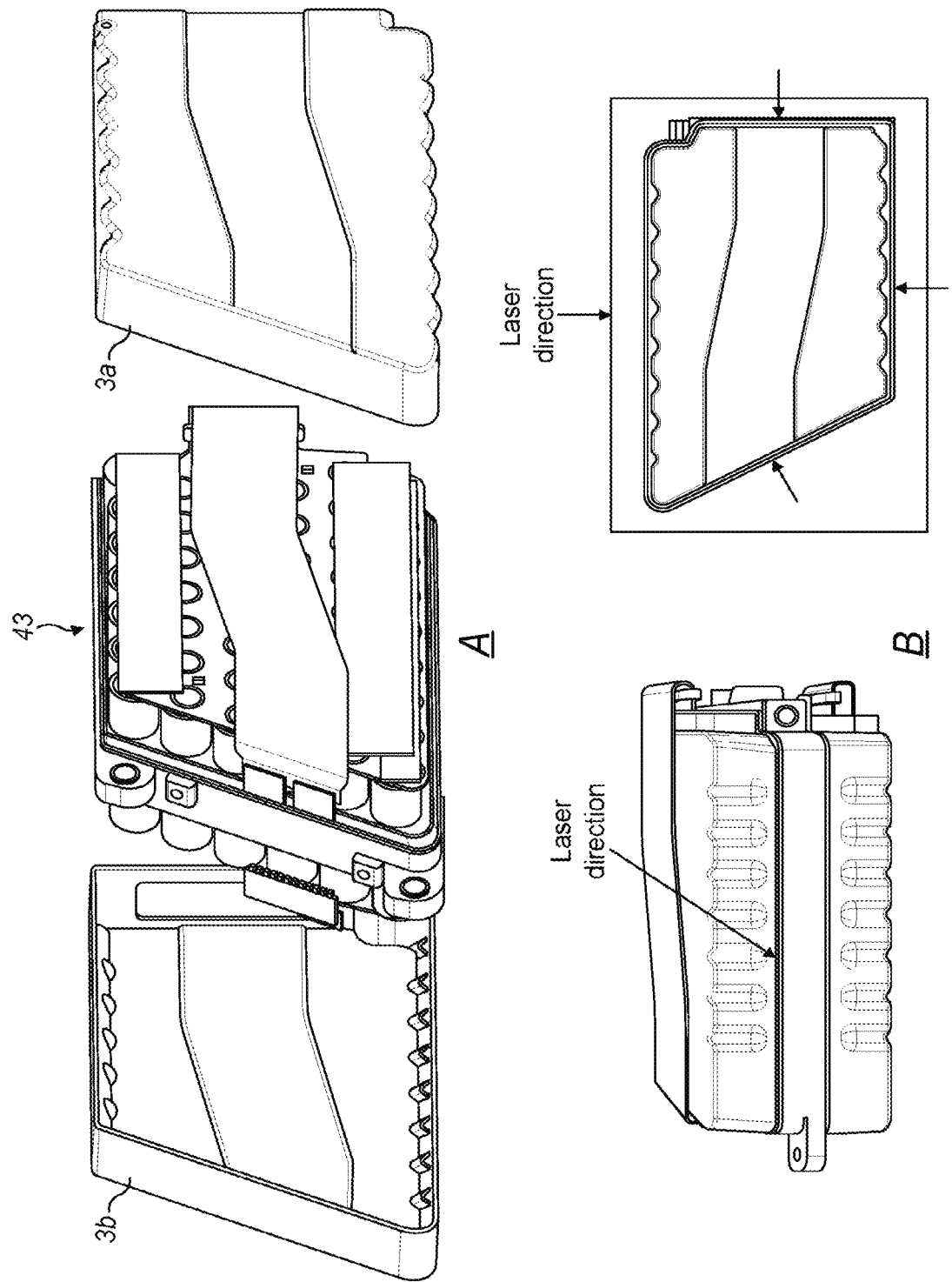
FIG. 11 shows a schematic diagram of a further part of the battery module assembly process.

FIG. 11 shows the process of attaching the housing parts to the cell tray. FIG. 11A shows the assembled cell tray 43 relative to the first housing part 3*a* and second housing part 3*b* prior to attachment. The first housing part 3*a* is attached from one side of the cell tray assembly 43 and the second housing part 3*b* is attached from the other side of the cell tray assembly 43. The cell tray, first casing and second casing may be constituted primarily by plastic. The first and second casings 3*a*, 3*b* can be attached to the cell tray using laser welding which heats one part to the point that it melts and fuses to the other part. This is shown in FIG. 11B.

The first casing 3*a* may be placed in contact with the cell tray such that it encloses the cell ends. The contact between the first casing 3*a* and the cell tray 7 is along an edge of the first casing. The first casing is shown as being cup shaped and the contact between the first casing and the cell tray 7 is along the rim of the cup. A laser beam can then be directed at the joint between the cell tray and first casing. One of the cell tray and first casing comprises a material that is configured to absorb energy from the laser beam and thus heat one of the cell tray and the first casing. In the FIG. 11, the material is contained within the cell tray along the region where it contacts the first casing. The heating from the material causes one of the cell tray and first casing to melt and fuse to the other thus welding the pieces together. The cell tray and first casing may otherwise be generally opaque to the laser beam without the presence of the material. The material can be any material that absorbs the laser light such as carbon black.

The second casing 3*b* may be placed in contact with the cell tray such that it encloses the cell ends. The contact between the second casing 3*b* and the cell tray 7 is along an edge of the second casing. The second casing is shown as being cup shaped and the contact between the second casing 3*b* and the cell tray 7 is along the rim of the cup. A laser beam can then be directed at the joint between the cell tray and first casing. One of the cell tray and second casing comprises a material that is configured to absorb energy from the laser beam and thus heat one of the cell tray and the first casing. In the FIG. 11, the material is contained within the cell tray along the region where it contacts the second casing. The heating from the material causes one of the cell tray and second casing to melt and fuse to the other thus welding the pieces together. The cell tray and second casing may otherwise be generally opaque to the laser beam without the presence of the material.

FIG. 11B shows example directions for the laser beam. Generally, the laser beam passes through the opaque/transmissive layer first before entering the absorbing layer that contains the material that causes heating. Thus, in the case shown in FIG. 11B the laser beam is projected in the direction such that it passes through the casing prior to entering the cell tray 7. The two casings may be assembled around the cell tray prior to welding of both of the casings. Alternatively, one casing may be brought into contact with the cell tray and welded prior to the other casing being brought into contact with the cell tray and being welded.

As shown in FIG. 11A, the busbars have wiring attached to them. The wiring may be passed through a hole in the casing prior to the attachment of the casing to the cell tray.

Figure 8:
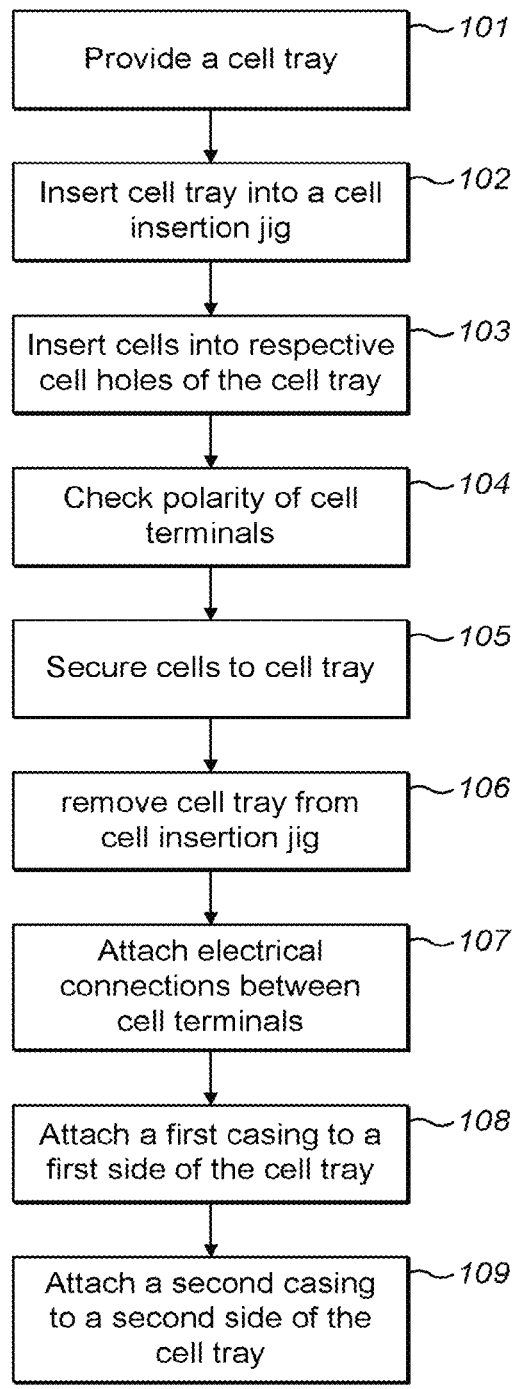
FIG. 8 shows a flow diagram of the battery module assembly process.
Figure 12:
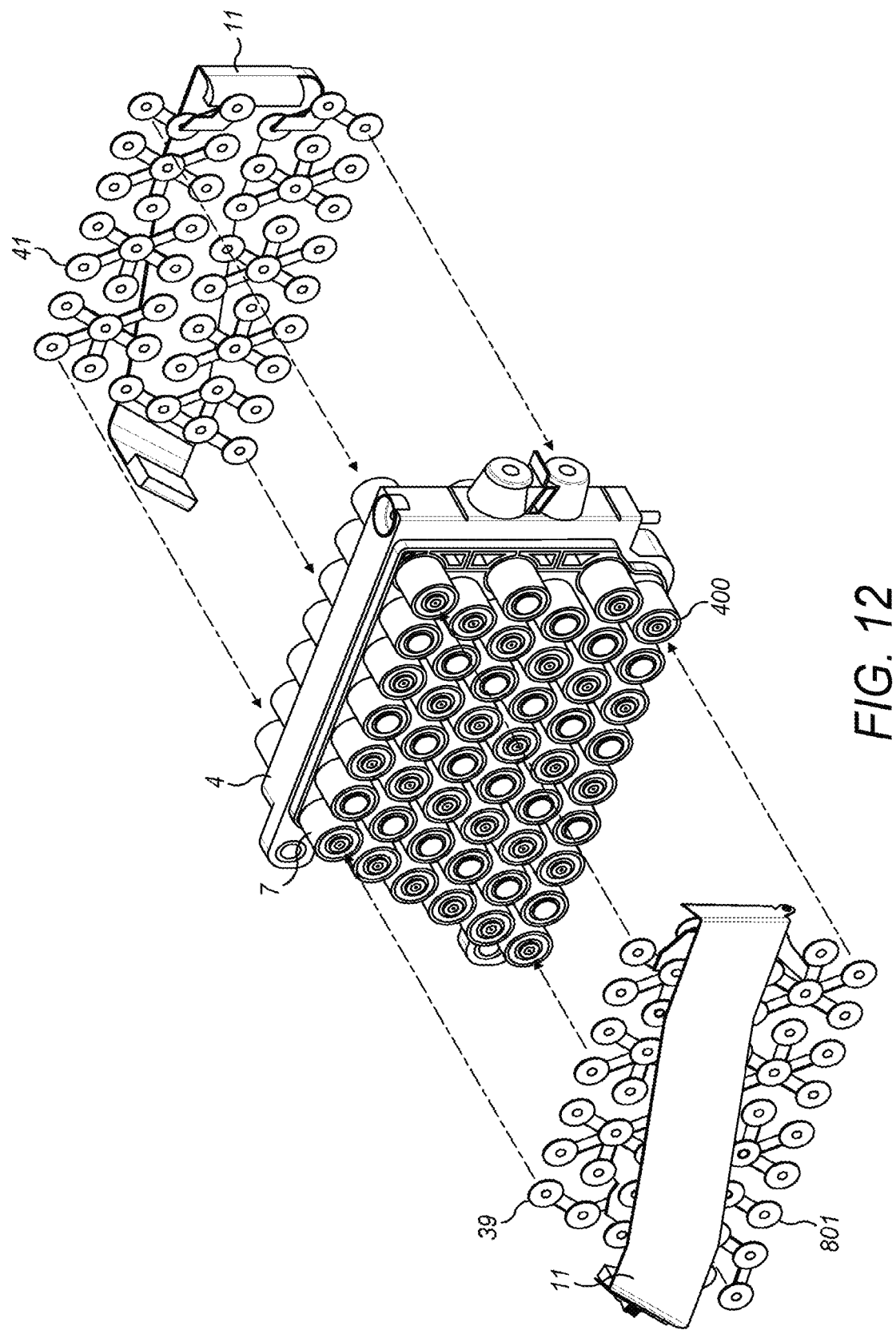
FIG. 12 depicts the attachment of cell to cell busbars to cell terminals.

Returning to step 107 of FIG. 8. Each of the cells may be cylindrical. Each cylindrical cell may comprise a pair of cell terminals, the terminals of the pair being located on opposing ends of the cell. The cells may be any elongate shape. Owing to the way in which the elongate cells 7 are arranged in cell tray 4, a portion of each cell 7 protrudes from each side of the cell tray 4. Thus, the two cell terminals of each cell are located on opposing sides of the cell tray 4. As shown in FIG. 12, a first set of busbars 39 may be attached to the cell terminals 400 located on one side of the cell tray 4. A second set of busbars 41 may be attached to the cell terminals located on a second side of the cell tray 4.

To attach the busbars 39, 41 to the cell terminals, the busbars are first aligned with the cells 7. As shown in FIG. 12, the cell to cell busbars 39, 41 comprise a number of through holes 801. As described above, the cells may be arranged in an array by cell tray 4. The number of through holes 801 in each set of busbars 39, 41 may correspond with the number of cell terminals 400 on each side of the cell tray 4. Thus, the cell to cell busbars 39, 41 may be aligned with cells 7 by aligning each of the through holes 801 of the cell to cell busbars 39, 41 with a cell terminal 400.

Each through hole 801 of the sets of cell to cell busbars 39, 41 is aligned with a cell terminal 400. FIG. 9 depicts a method of aligning and electrically connecting a busbar 10 and a cell terminal 400. The process may be repeated for each individual cell terminal consecutively. Alternatively, a plurality of through holes 801 may each be aligned with a cell terminal 400 simultaneously. In another example, each of the through holes of the busbars on one side of the cell tray may be aligned with a cell terminal simultaneously.

As described herein, the busbars 10 may be integrated with a flexible printed circuit board. Thus, in an example, by aligning at least two through holes with respective cell terminals it may be possible to align all of the through holes with a respective cell terminal. In other words, because the flexible printed circuit board fixes the position in a plane of the busbars relative to each other, once two through holes have been aligned with respective cell terminals, the remainder of the through holes may be necessarily aligned with respective cell terminals.

In an example, a jig (not shown) may be provided to align the through holes of each busbar with respective cell terminals. The jig may physically constrain a portion of each busbar, or a portion of the flexible printed circuit board in which the busbars are integrated, such that the busbars are positioned in a manner in which each through holes is aligned with a respective cell terminal.

Figure 13:
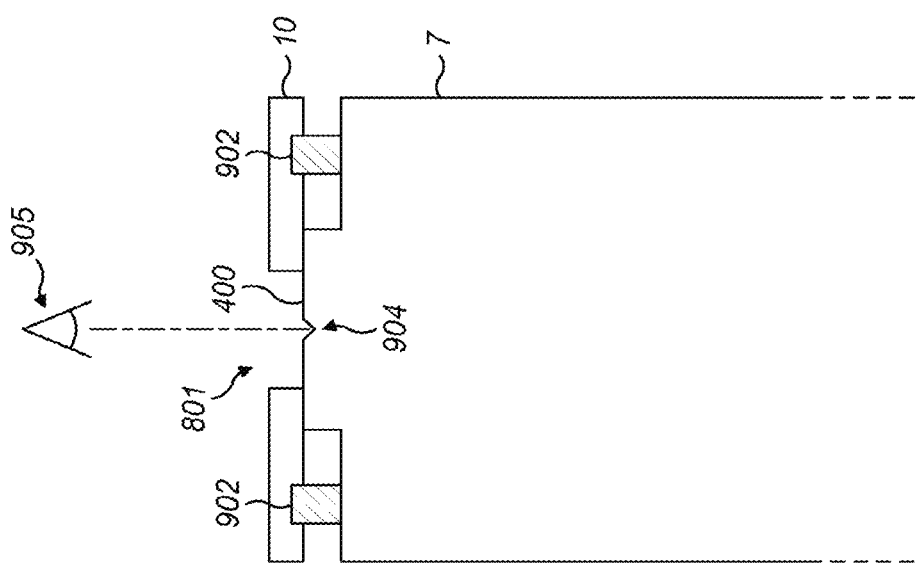
FIG. 13 depicts a method of aligning and electrically connecting a busbar and a cell terminal.

As depicted in FIG. 13, cell terminal 40 may comprise a visual marking 904. In another example, the through hole 801 may be aligned with the cell terminal using an optical alignment technique in dependence on the visual marking 904. That is, the visual marking may be a marking that is visible to an aligning tool comprising a detector 905. The detector 905 may be a camera. The aligning process may be dependent on the output of detector 905. The aligning process may be automated.

Optically aligning may involve moving the cell terminal 400 and the busbar 10 relative to each other such that the visual marking 904 is located in a predetermined position with respect to the through hole 801. The aligning tool may be configured to determine and adjust the relative positions of the cell terminal and the busbar in dependence on the output of camera 905. For example, the array of cells may be positioned on a movable bed. Alternatively, the busbar may be movable.

Visual marking 904 may be an indentation in the centre of cell terminal 400. Optically aligning the busbar 10 and the cell terminal 400 may involve centering the visual marking 904 with respect to the through hole 801. In other examples the visual marking may be any pattern or series of indentations or surface markings (such as ink markings). In some examples, the visual marking may not be visible to humans. For example, the visual marking may be visible to a detector 905 that detects wavelengths of light outside of the visible spectrum.

In other examples, the aligning process may be a physical aligning process. In these examples, the aligning tool may comprise an appendage that physically interacts with a feature of the cell terminal 400, such as an indentation, and the busbar 10, so as to determine their relative positions.

Once the busbar 10 and the cell terminal 400 have been aligned they are electrically connected. As described herein, an electrical connection may be established by welding busbar 10 to cell terminal 400. FIG. 13 depicts weld 902 attaching the busbar 10 to the cell terminal 40 such that an electrical connection between the busbar and the cell terminal is established. As depicted in FIG. 9, the busbar 10 may be welded directly onto the cell terminal. Any known welding technique may be used, such as spot welding or friction stir welding. Welding may be performed whilst the cell comprises electrolyte.

The welding tool may be aligned with the cell terminal 400 using an optical alignment technique in dependence on the visual marking 904. That is, the visual marking may be a marking that is visible to the welding tool comprising a detector 905. The detector 905 may be a camera. The aligning process may be dependent on the output of detector 905. The aligning process may be automated.

Optically aligning may involve moving the welding tool and the cell terminal 400 relative to each other such that the visual marking 904 is located in a predetermined position with respect to the welding tool. The welding tool may be configured to determine and adjust its position relative to the cell terminal in dependence in the output of detector 905. For example, the array of cells may be positioned on a movable bed. Alternatively, the welding tool may be movable.

The aligning tool and the welding tool may be on the same tool head. Alternatively, the aligning tool and the welding tool may be on separate tools. The aligning and welding tools may be controlled by a robot arm.

The welding process may be automated. The welding tool may be configured to perform a predetermined weld pattern in dependence on the visual marking 904. For example, the welding tool may be configured to perform a series of spot welds positioned on the circumference of a circle defined relative to the visual marking 904. In another example, the welding tool may perform a continuous weld positioned on the circumference of a circle defined relative to the visual marking 904. The circle may be centred on the visual marking 904.

The busbars 10 may be integrated with a flexible printed circuit board. Thus, the aligning and electrically connecting processes described herein may be performed whilst the busbar 10 is integral with a flexible printed circuit board.

When a cell is manufactured it is filled with electrolyte through an opening. Often the opening is within one of the cell terminals. Once filled with electrolyte, the opening is then closed. Typically, such an opening is closed using a cell fill plug. Thus, a cell fill plug is often positioned in one of the cell terminals of a cell. A cell fill plug is typically welded into place once inserted.

Figure 14:
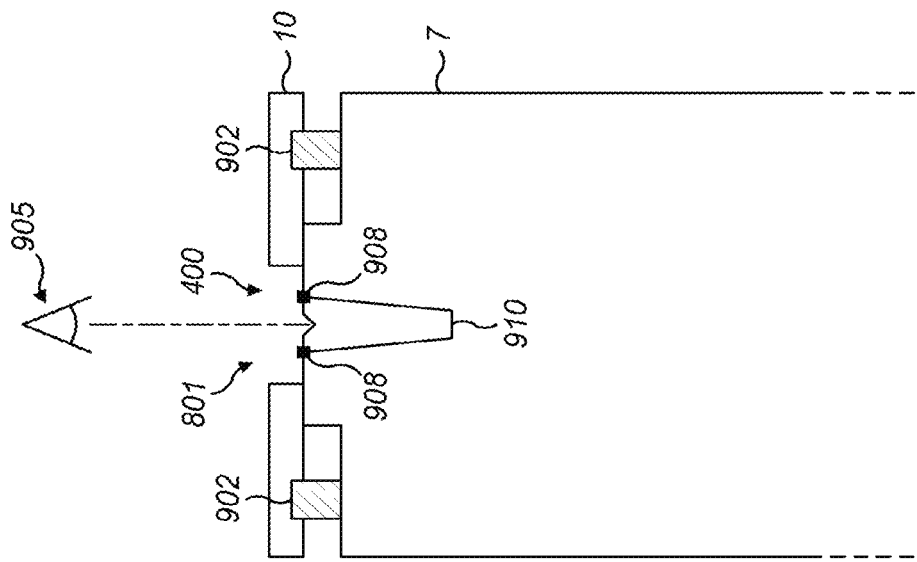
FIG. 14 depicts the attachment of a cell to cell busbar to a cell terminal having a cell fill plug.

FIG. 14 depicts the attachment of a cell to cell busbar 10 to a cell terminal 400 comprising a cell fill plug 910. The cell fill plug 910 may be held in place by weld 908. The cell fill plug may be comprised within the negative cell terminal (e.g. the cathode). As shown in FIG. 14, the cell fill plug may not form a contacting surface of the cell terminal. That is, the cell fill plug may have an upper diameter that is smaller than the inner diameter of the through hole in the busbar. In this example, the busbar may be in electrical contact with another surface of the cell terminal. This may be because the cell fill plug is less conductive, or provides higher resistance, than another surface of the cell terminal. The busbars 10 may be sized and shaped such that, in use, they are not in electrical contact with the cell fill plug 910.

In other unshown examples, the cell fill plug may form a contacting surface of the cell terminal. That is, the cell fill plug may have an upper diameter that is larger than the inner diameter of the through hole in the busbar. In this case, the cell fill plug may be in electrical contact with the cell busbar.

As shown in FIG. 14, the cell fill plug may comprise the visual marking 904. In other examples, the visual marking may be on another surface of the cell terminal that is visible to the detector 905.

Electrically connecting the busbar 10 to the cell terminal 400 may welding a portion of the first and/or second busbar to each cell terminal in a manner that avoids welding onto the cell fill plug and/or a weld 908 associated with the cell fill plug (referred to herein as the cell fill plug weld 908). That is, weld 902 may be performed on another surface of the cell terminal. This is because welding onto the cell fill plug 910 and/or the cell fill plug weld 908 may damage the cell fill plug 910 and/or the cell fill plug weld 908. As shown in FIG. 14, weld 902 is positioned remotely from the cell fill plug 910 and/or the cell fill plug weld 908.

As described herein, the weld pattern may be predetermined. The predetermined weld pattern may be predetermined in dependence on a known arrangement of the cell fill plug 910 and/or the cell fill plug weld 908 for a cell. In another example, the weld pattern may be determined in real time in dependence on the observed positions of the cell fill plug 910 and/or the cell fill plug weld 908. In an example, the actual positions of the cell fill plug 910 and/or the cell fill plug weld 908 may be observed by the detector 905. In another example, the position of a visual marking 904 on the cell terminal may be observed by the detector 905 and the positions of the cell fill plug 910 and/or the cell fill plug weld 908 may be derived in dependence on the observed position of the visual marking. A different visual marking may be used for the positive cell terminal and the negative cell terminal of a cell so that the welding tool can determine whether a cell terminal comprises a cell fill plug—and thus determine a suitable weld pattern accordingly.

A cell terminal may comprise a cell vent port (not shown). The cell vent port may be comprised within the positive cell terminal (e.g. the anode). The cell vent port may be configured to, on activation, expel cell effluent from the cell. The cell effluent may be cell electrolyte that has been caused to be ejected from the interior of the cell. The cell vent port may be activated when the pressure within the cell exceeds a threshold. The cell vent port may comprise a cell vent score (not shown). The cell vent score may be a weakened section of the cell terminal, for example, a section of material having a reduced cross-section. The cell vent score may be configured to fail when the pressure within the cell exceeds a threshold. The aligning and attachment process described above may be configured such that the cell vent port is not impeded by busbar 10, or weld 902.

As described herein, the weld pattern may be predetermined. The predetermined weld pattern may be predetermined in dependence on a known position of a cell vent port for a cell. In another example, the weld pattern may be determined in real time in dependence on the observed position of the cell vent port. In an example, the actual positions of the cell vent port may be observed by the detector 905. In another example, the position of a visual marking 904 on the cell terminal may be observed by the detector 905 and the position of the cell vent port may be derived in dependence on the observed position of the visual marking. A different visual marking may be used for the positive cell terminal and the negative cell terminal of a cell so that the welding tool can determine whether a cell terminal comprises a cell vent port—and thus determine a suitable weld pattern accordingly.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of manufacturing a battery module, the battery module comprising:
   a plurality of elongate cells, each cell of the plurality of elongate cells comprising a first cell terminal and a second cell terminal, the first cell terminal and the second cell terminal being located on opposing ends of that cell, the first cell terminal comprising a cell fill plug; and
   a busbar comprising a plurality of through holes;
   the method of manufacturing the battery module comprising:
   aligning the plurality of through holes comprised by the busbar with a plurality of cell terminals of the plurality of elongate cells such that each through hole of the plurality of through holes is aligned with a respective cell terminal of the plurality of cell terminals, wherein the plurality of cell terminals comprises one or more first cell terminals; and
   after aligning, electrically connecting the busbar to the plurality of cell terminals of the plurality of elongate cells, wherein electrically connecting comprises welding the busbar to the one or more first cell terminals, which comprise a respective one or more cell fill plugs, in a manner that avoids welding onto the one or more cell fill plugs and/or one or more cell fill plug welds associated with the one or more cell fill plugs.

2. The method of claim 1, wherein the busbar is sized and shaped such that, when electrically connected to the plurality of cell terminals, the busbar is not in contact with the one or more cell fill plugs.

3. The method of claim 1, wherein electrically connecting comprises welding the busbar to a surface of each first cell terminal of the one or more first cell terminals other than a surface of the cell fill plug comprised by that first cell terminal.

4. The method of claim 1, wherein the cell fill plug comprised by each of the one or more first cell terminals has an outer diameter that is smaller than the inner diameter of the respective through hole, of the plurality of through holes, that is aligned with the first cell terminal comprising that cell fill plug.

5. The method of claim 1, wherein a cell fill plug closes an opening in a cell through which that cell was filled with electrolyte.

6. The method of claim 1, wherein the first cell terminal comprised by each cell is a cathode.

7. The method of claim 1, wherein electrically connecting comprises optically aligning a welding tool with a cell terminal of the plurality of cell terminals.

8. The method of claim 7, wherein the cell terminal, which is aligned with the welding tool, comprises a visual marking in dependence on which the welding tool is aligned with that cell terminal.

9. The method of claim 8, wherein electrically connecting comprises the weld tool performing a predetermined weld pattern in dependence on the visual marking.

10. The method of claim 8, wherein the cell terminal, which is aligned with the welding tool, is a first cell terminal that comprises a cell fill plug, and the visual marking is comprised by the cell fill plug.

11. The method of claim 1, wherein the plurality of cell terminals comprises one or more first cell terminals and one or more second cell terminals.

12. The method of claim 1, wherein the second cell terminal comprised by each cell comprises a cell vent port.

13. The method of claim 12, wherein the plurality of cell terminals comprises one or more second cell terminals, and wherein electrically connecting comprises welding the busbar to the one or more second cell terminals, which comprise a respective one or more cell vent ports, such that the one or more cell vent ports are not impeded by the busbar.

14. The method of claim 12, wherein a cell vent port is configured to, on activation, permit cell effluent to be expelled from a cell.

15. The method of claim 1, wherein the second cell terminal comprised by each cell is an anode.

* * * * *